United States Patent
Sahita et al.

(10) Patent No.: US 7,739,517 B2
(45) Date of Patent: Jun. 15, 2010

(54) HARDWARE-BASED AUTHENTICATION OF A SOFTWARE PROGRAM

(75) Inventors: Ravi Sahita, Beaverton, OR (US); Travis T. Schluessler, Hillsboro, OR (US); David M. Durham, Hillsboro, OR (US); Amir Zinaty, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1331 days.

(21) Appl. No.: 11/096,591

(22) Filed: Mar. 31, 2005

(65) Prior Publication Data

US 2006/0236125 A1 Oct. 19, 2006

(51) Int. Cl.
*H04L 9/00* (2006.01)

(52) U.S. Cl. ............................................ 713/193
(58) Field of Classification Search ................. 713/164, 713/165, 167, 189, 193, 180, 186; 726/26, 726/24, 22
See application file for complete search history.

(56) References Cited

U.S. PATENT DOCUMENTS

| | | | |
|---|---|---|---|
| 5,657,445 A * | 8/1997 | Pearce | 726/23 |
| 5,892,904 A * | 4/1999 | Atkinson et al. | 726/22 |
| 5,953,502 A * | 9/1999 | Helbig, Sr. | 726/24 |
| 5,978,912 A | 11/1999 | Rakavy et al. | |
| 6,094,731 A * | 7/2000 | Waldin et al. | 714/38 |
| 6,101,586 A * | 8/2000 | Ishimoto et al. | 711/163 |
| 6,243,809 B1 | 6/2001 | Gibbons et al. | |
| 6,408,387 B1 | 6/2002 | Wells | |
| 6,581,159 B1 | 6/2003 | Nevis et al. | |
| 2003/0037244 A1 | 2/2003 | Goodman et al. | |
| 2003/0097581 A1 | 5/2003 | Zimmer | |
| 2004/0083379 A1 * | 4/2004 | Neuman et al. | 713/193 |
| 2005/0216577 A1 | 9/2005 | Durham et al. | |
| 2005/0278499 A1 | 12/2005 | Durham et al. | |
| 2005/0289311 A1 | 12/2005 | Durham et al. | |
| 2006/0095551 A1 | 5/2006 | Leung et al. | |
| 2006/0095967 A1 | 5/2006 | Durham et al. | |
| 2006/0098646 A1 | 5/2006 | Sahita et al. | |

OTHER PUBLICATIONS

Rabek et al. Detection of Injected, Dynamically Generated and Obfuscated Malicious Code, Oct. 27, 2003, pp. 76-82.*
Hypertext Transfer Protocol—HTTP/1.1, The Internet Society, Jun. 1999, RFC 2616, 6 pages.
Web Services Security: SOAP Message Security 1.0 (WS-Security 2004), OASIS Standard 200401, Mar. 2004, 56 pages.
Bellwood, et al., UDDI Version 3.0, OASIS UDDI Spec Technical Committee Specificaiton, Jul. 19, 2002, 413 pages.
Editors: Bray, et al., Extensible Markup Language (SML) 1.0 (2nd Edition), W3C Recommendation, Oct. 2000, 58 pages.

(Continued)

*Primary Examiner*—Beemnet W Dada
(74) *Attorney, Agent, or Firm*—Blakely, Sokoloff, Taylor & Zafman LLP

(57) ABSTRACT

Identity of software is authenticated with hardware on a system. The hardware may be accessible to the operating system, making the mechanisms available to software makers. The identity of the software may be authenticated using fundamental properties of the software itself, providing greater security than merely relying on transferable identifiers, for example, keys.

30 Claims, 6 Drawing Sheets

OTHER PUBLICATIONS

Editors: Gudgin et al., SOAP Version 1.2 Part 1: Messaging Framework and Part 2: Adjuncts, W3C Recommendation Jun. 24, 2003, 112 pages.

Freier, et al., The SSL Protocol Version 3.0, Transport Layer Security Working Group; Nov. 18, 1996, 66 pages.

Guttman et al., Service Location Protocol, Version 2, RFC 2608, Jun. 1999, 55 pages.

Twycross et al., Implementing and Testing a Virus Throttle, Trusted Systems Laboratory, HP Laboratories Bristol, HPL-2003-103, (May 21, 2003),11 pages.

Williamson, Design, Implementation and Test of an Email Virus Throttle, Information Infrastructure Laboratory, HP Laboratories Bristol, HPL-2003-118, (Jun. 30, 2003), 10 pages.

Williamson, Throttling Viruses: Restricting Propagation to Defeat Malicious Mobile Code, Information Infrastructure Laboratory, HP Laboratories Bristol, HPL-2002-172, (Jun. 17, 2002), 7 pages.

Williamson, Throttling Viruses: Restricting Propagation to Defeat Malicious Mobile Code, Information Infrastructure Laboratory, HP Laboratories Bristol, HPL-2002-172(R.1), (Dec. 10, 2002),9 pages.

Williamson et al., Virus Throttling, Research Feature 1: Virus Bulletin, Virus Bulletin Ltd., The Pentagon, Abingdon, Oxfordshire, OX14 3YP, England, (Mar. 2003), p. 8-11.

Williamson et al., Virus Throttling for Instant Messaging, Digital Media Systems Laboratory, HP Laboratories Bristol, HPL-2004-81, (May 5, 2004),10 pages.

* cited by examiner

HARDWARE-BASED AUTHENTICATION OF A SOFTWARE PROGRAM

FIELD

Embodiments of the invention relate to computer system security, and more particularly to code identity verification.

BACKGROUND

Software programs operating on a host system often interact with other software, firmware, or hardware components and/or agents executing on the same host system. The software programs may be divided on the operating environment (hardware and/or software) of the host system based on levels of privilege. For example, some operating systems may have several rings of privilege. The software programs are traditionally protected only by the privilege levels associated with executing code. Each different level of privilege allows software executing within that level to perform a certain set of operations, while disallowing other operations. However, traditional operating environments provide unrestricted access to virtually any platform resources (hardware and/or software) from programs of many different privilege levels. In addition, programs executing within a given privilege level typically have access to some or all of the resources used by other programs executing in that privilege level. Thus, there is no protection of software programs within privilege levels on the platform, making the software programs vulnerable to compromise if another software program of the same privilege level becomes compromised.

Many operations involving interaction with another component either in the host system or external to it over a network normally request identification of the executing software program. However, because identity of a software program is traditionally defined by possession of one or more keys, or software values/strings, any program or software executing that has access to the keys may traditionally be deemed to have the identity represented by the keys. Thus, traditional platforms do not provide adequate safeguards to ensure that a software program is securely identified with software mechanisms prior to performing actions tied to the identity of the software program.

Current hardware-based methods for proving identity of a message sender include system management interrupt (SMI) and trusted platform module (TPM) based core root of trust measurement (CRTM), such as solutions from the Trusted Computing Platform Alliance (TCPA) and Trusted Computing Group (TCG), or an equivalent solution. These methods are generally considered to be more secure than many or all current software-based solutions for at least the reason that access to keys is restricted with hardware components. Disadvantages to these solutions include the complexity of implementation, and the fact that they may be hidden from the operating system (OS). In some cases, for example, the use of a TPM, additional discrete hardware components are required in a protected system, which may increase the difficulty of implementation.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
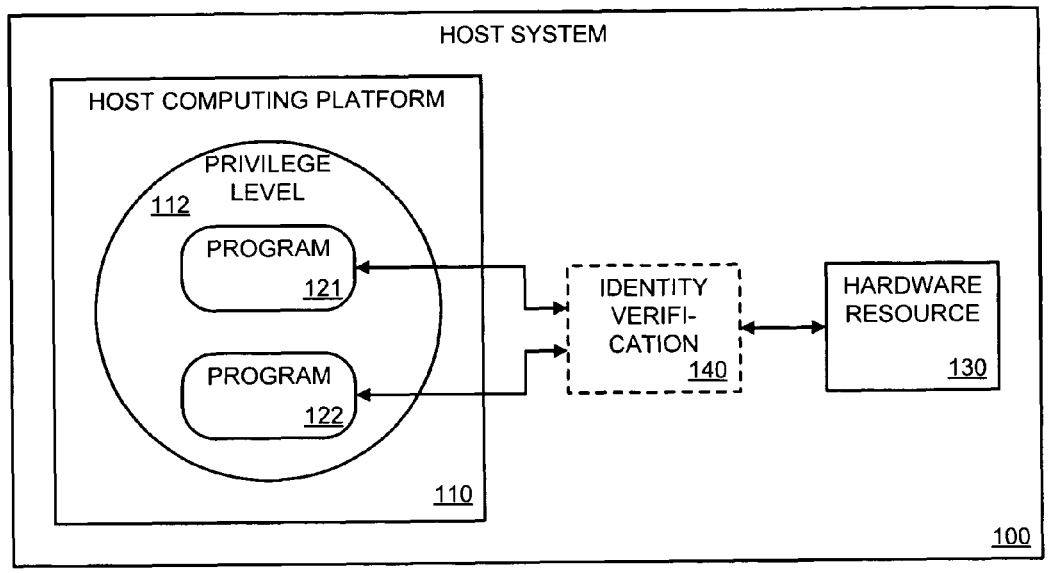
FIG. 1 is a block diagram of an embodiment of a host system having program identity verification using fundamental attributes of the verified program.

A software program may be more uniquely identified by fundamental properties of the program itself, rather than by presenting a key that may be exchangeable with another program. Four fundamental properties of a program or other software may be expressed as: the machine instructions that constitute the software (its code store), the location of the code store in memory, the data constituting the software's configuration, and the location of the configuration data in memory. These fundamental properties of a software program may be used to identify the software program with greater security than the use of keys, or other transferable identifiers. Additionally, messages sent from a software program to another intra-platform entity with an identifier based on these properties may be authenticated to prove the presence of the correct software program on the host platform.

The code store may be considered a fundamental piece of the program's identity because a system will operate as directed in the machine instructions of the code store. Thus, if an attacker modified the code store, the system could be programmed to behave as desired by the attacker, rather than as intended in the original program. The integrity of the code store may suggest that the code store has not been altered. The location of the machine instructions in memory are a fundamental piece of the program's identity because a software program is identified by memory management (e.g., hardware and/or code to store objects in memory and/or access objects in memory) at a particular physical location, even if a virtual memory structure is in place in the system. A program stored in a different physical memory location is merely a clone, or a copy of the original program. The copy could be a malicious program "pretending" to look like the original. The same arguments may apply to the data constituting the software program's configuration, and the location of the configuration data in memory. Altered configuration settings could completely alter the intended execution of the program. Likewise, the configuration settings are identified with a physical location by a memory manager.

In one embodiment identity verification or authentication is performed using one or more fundamental properties of software executing on a processor. Identity verification can determine if a program or other software originating a message, request, or instruction is who it purports to be. The program may be identified by these fundamental pieces of identity by an authenticating entity, for example, a hardware entity other than the executing processor. In one embodiment the authenticating entity may validate an integrity of the code store, for example, by obtaining an image of a program associated with an instruction executing on the processor and validating the image. The image may be validated through byte-by-byte comparison, cryptographic hashing, etc. In one embodiment the authenticating entity may validate the location of code associated with an operation, for example, by determining the location in memory of associated with the instruction executing on the processor. Hardware settings associated with the processor's execution, for example, the value stored in an instruction pointer register or program counter register, may be used to determine the location associated with the instruction executing on the processor. The source location from memory of the instruction may be determined and compared against a value registered at the time the program was loaded into memory to determine if the instruction actually originated from within the code store of the validated program. Hardware settings of the processor may also be used to determine an entry point of the executing instruction, for example, to verify that the instruction not only originated from within the validated program, but is being executed from a proper sequence within the program, and was not simply lifted from elsewhere in the valid program to execute in an invalid manner.

Thus, hardware may be used to authenticate a software program or other message sender to validate that an instruction to be executed is from a valid program and/or code or data sequence associated with a program and that the instruction is being executed from the correct location. These attributes may be considered to be the "what" and "where" associated with a software program executing. Verification of the "what" and "where" of the program may provide a more secure authentication of the program than traditional software methods involving key exchange, and with less complexity than traditional hardware-based approaches.

Descriptions of certain details and implementations follow. Reference may be made herein to an "embodiment," which may be understood as describing a particular feature, structure, or characteristic included in at least one embodiment of the invention. Thus, the appearance of phrases such as "in one embodiment," or "in an alternate embodiment" may describe various embodiments and implementations of the invention, and may not necessarily all refer to the same embodiment.

FIG. 1 is a block diagram of an embodiment of a host system having program identity verification using fundamental attributes of the verified program. Host system 100 represents an electronic device or system that executes programs. Host system 100 may be, for example, a desktop computer, a laptop computer, a personal digital assistant (PDA) or other handheld computing or communication device, a server, etc. Host system 100 may include host computing platform 110, which represents a platform or host computing environment having hardware and/or software, including an operating system (OS) to provide an environment wherein programs may execute/operate. Host computing platform 110 may have one or more privilege levels to associate programs with a level of privilege or system resource access. Privilege level 112 may be an abstraction of host computing platform 110 that provides a similar level of resource access to programs 121 and 122. System resource access, or privilege, may refer to the ability of a program to interact with a hardware component, including, but not limited to, memory storing keys and/or configuration, video/graphics hardware, network interface hardware, communication hardware, user interface hardware (e.g., a mouse, a keypad/keyboard, a touchscreen), audio hardware, etc.

In one embodiment program 121 has privilege level 112, as does program 122. Assume that both programs 121 and 122 are valid programs, and that program 122 has been corrupted or compromised by an attacker, for example, a worm, virus, etc. In traditional system, because program 122 has the same privilege level as program 121, it may have access to hardware resources accessible to program 121. For example, a key representing the identity of program 121 in traditional systems may reside in memory accessible to program 122. If program 122 is corrupted, it may be used to steal the key of program 121, and could then impersonate program 121 to other programs or hardware. Program 122 may have a valid location, but may have a corrupted image. Assume in another case that program 121 is a valid program and that program 122 is a corrupted copy of the program with keys stolen from program 121. Program 122 may appear identical to program 121, but would be stored in a different location in memory. However, because of traditional identifier program authentication, in either case a validating entity may permit access to program 122 as though it were program 121.

In one embodiment access to hardware resource 130 may be controlled or monitored through identity verification 140. Rather than the traditional approach mentioned above, hardware resource 130 may authenticate an accessing program, such as programs 121 and/or program 122, by determining that the accessing program has a valid program image, and is located at a proper location in memory. Thus, in the example cases above, if program 122 were a valid program, but inappropriately accessing hardware resource 130, hardware resource 130 may determine that program 122 has a valid source location, but has a corrupted image. In the other case, hardware resource 130 may determine that program 122 has a valid image but an incorrect source location. In either case, hardware resource 130 may fail program 122 on authentication, and refuse access to program 122. In addition, hardware resource 130 may trigger an exception condition, signal an alert, etc. Triggering an exception may include sending an alert message to a security agent, alerting a user and/or administrator, etc.

Note that even if program 122 is compromised and/or a rogue program, program 121 may attempt to access hardware resource 130, and pass authentication through identity verification 140. Thus, program 121 may continue to validly access hardware resource 130, and the compromise of program 122 may not result in a complete quarantine from all programs of hardware resource 130 due to a detected attack. The authentication mechanism may allow valid programs to continue to access hardware resource 130, while simultaneously preventing corrupt and/or malicious code from accessing hardware resource 130. As opposed to previous hardware solutions, such as the TPM solution mentioned above, identity verification 140 may be implemented without the requirement of additional hardware. Additionally, other hardware solutions, such as the TPM solution, may operate below the OS, meaning they may not be visible to the OS. They may be considered not visible if the OS is unable to access them, if the OS is unaware of their execution, etc. The authentication solution as described with respect to identity verification 140 operates on fundamental attributes of the software programs, and thus may not need to operate outside the view of the OS in order to provide secure authentication.

Figure 2:
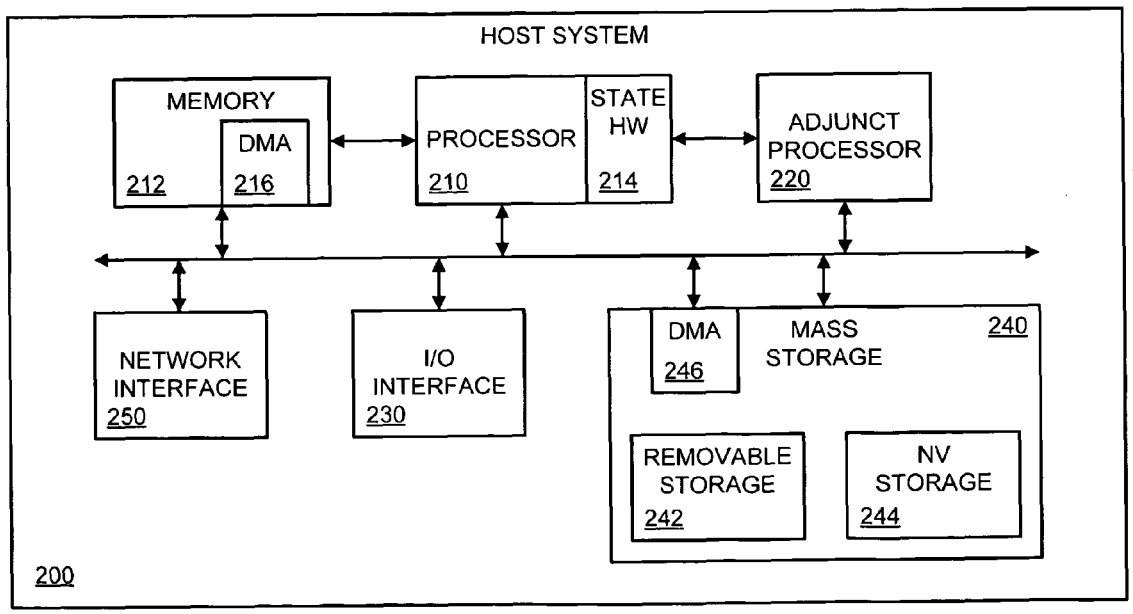
FIG. 2 is a block diagram of an embodiment of a host system having host processor state hardware and an adjunct processor.

FIG. 2 is a block diagram of an embodiment of a host system having host processor state hardware and an adjunct processor. Host system 200 includes processor 210, which may represent a processor, microcontroller, central processing unit (CPU), etc. Processor 210 may include one or more processing cores, including parallel processing capability. Processor 210 may access memory 212 to retrieve/obtain instructions and/or data to use for execution to direct operation and/or functions of host system 200. Memory 212 may include random access memory (RAM), and may include one or more of the following: static RAM (SRAM), dynamic RAM (DRAM), synchronous DRAM (SDRAM), dual-data rate RAM (DDRRAM), etc. Memory 212 may include one or more sequences of code and/or data stored therein. A code sequence may be a set or a group of machine instructions representing one or more function calls, one or more subroutines, or one or more operations. A program may refer herein to any one of these alone, as well as a conjunction of one or more of these. The program may refer to an executable file or code segment, a linked library (e.g., a DLL), a configuration file, a data segment, etc. Each program or code sequence may have an associated physical location in memory 212 and/or mass storage 240. When a program is retrieved from storage, for example, mass storage 240, to memory 212, a location in memory may be registered by a memory manager to associate with the program.

In one embodiment memory 212 includes DMA (direct memory access) 216, which may represent control logic (hardware and/or software), controllers, buses, etc., to provide access to information stored in memory 212 without processing of the information by processor 210. Because DMA 216 operates without interaction with processor 210, DMA 216 may provide memory access that cannot be circumvented by software. In one embodiment, adjunct processor 220 may make a DMA request of DMA 216 to obtain an image of an instruction sequence/program of memory 212 to validate the program. The image may be obtainable with DMA 216 without having the risk of a program executing on processor 210 circumventing the request by altering the code image obtained from memory. In this way there is a secure hardware-based mechanism available to hardware resources on host system 200 to obtain a code image for verification.

Host processor 210 may also include state hardware 214, which represents one or more hardware mechanisms for representing a state of processor 210. For example, an instruction pointer may indicate where in memory processor 210 is executing. The instruction pointer may be stored in a register on processor 210. The instructions pointer may also be an enhanced instruction pointer (EIP) in an implementation wherein processor 210 may support such a pointer. A program counter may also be a register storing information regarding an address of an instruction to execute. In addition to an instruction pointer or a program counter, any equivalent mechanism may be implemented wherein an instruction address or other state information representing execution of processor 210 may be obtained. State hardware 214 may include mechanisms for accessing such hardware registers where state information is found.

In one embodiment state hardware 214 may include a Joint Test Action Group (JTAG) interface, as described in the Institute of Electronics and Electrical Engineers (IEEE) Standard 1149.1 specification, IEEE 1149.1-2001 Test Access Port and Boundary-Scan Architecture, 2001. One use of the JTAG interface is to perform debug and/or test on a processor. The JTAG interface may be an Enhanced JTAG interface (EJTAG), defined by the same standard, or a test access port (TAP) as may be present on certain processors available from Intel Corporation of Santa Clara, Calif. A TAP interface may be a subset of types of JTAG interface. Thus, it may be possible to observe execution of processor 210 cycle by cycle, and obtain register values from processor 210 at each instruction cycle.

In one embodiment adjunct processor 220 may function as an authenticating entity, authenticating software programs using fundamental attributes of the software to validate software in memory 212. Adjunct processor 220 may represent one or more pieces of hardware used to authenticate software. Adjunct processor 220 may be a separate physical device from processor 210, and may be hardware located on Input/Output (I/O) interface 230, mass storage 240, or network interface 250 shown on host system 200, or another hardware resource not shown on host system 200. Adjunct processor 220 may be physically part of processor 210, as separate control logic, as a parallel core, etc.

I/O interface 230 represents one or more interfaces to input and/or output devices of host system 210, including a mouse, keyboard, touchscreen, touchpad, audio system, video/graphics system, etc. Each of these may have separate hardware or circuits associated with them, which may be accessed via software located in memory 212. Network interface 250 represents one or more circuits or systems to provide access to a network of computing devices and associated connectors, routers, transmission lines, etc.

Mass storage 240 may include non-volatile storage to store persistent data on host system 200. For example, mass storage 240 may include one or more hard disks and associated controllers, removable storage 242, and non-volatile storage 244. Removable storage 242 may include disks and associated drives, universal serial bus (USB) storage devices and associated ports. Non-volatile storage 244 may include flash memory, read only memory (ROM), etc. In one embodiment mass storage 240 includes DMA (direct memory access) 246, which may represent control logic (hardware and/or software), controllers, buses, etc., to provide access to information stored in mass storage 240 without processing of the information by processor 210. Because DMA 246 operates without interaction with processor 210, DMA 246 may provide memory access that cannot be circumvented by software. For example, adjunct processor 220 may make a DMA request of DMA 246 to obtain a known valid code image of an instruction sequence/program of memory 212 that will be used to compare an image of the program from memory 212. This may allow an entity (e.g., the authenticating processor) to obtain a known good, or valid, copy of a code image. Note that in a case where a program is not cryptographically signed by an original author or publisher of the program, then using storage to obtain a code image is not any more secure than retrieving a copy of an image from memory.

Adjunct processor 220 may thus obtain a code image and/or configuration information for verification from memory 212 and/or mass storage 240 with DMA 246 and/or another hardware mechanism on host system 200. Adjunct processor 220 may verify the obtained code image or configuration information (or generically, the "image") against the valid image to determine the integrity of the image. The integrity may be determined, for example, by performing a byte-by-byte comparison of the image against the known good image. The known good image may be stored in mass storage 240, and may in one example be the code stored in mass storage 240 to test against a copy stored in memory 212. An alternative to a byte-by-byte comparison may be to perform a checksum operation on the code and compare the result to an expected result. A hash function may also be performed, and in one embodiment a cryptographic hash is performed and checked against an expected result. The expected or known good result may be stored in a location accessible to adjunct processor 220, in a secure location in memory 212, or in mass storage 240 in a secure location. In one embodiment a publisher signs a program, and adjunct processor 220 verifies the signature of the publisher. The publisher may sign the program with a public key that produces a signature that is stored in memory with the program. In this case a secure location may be unnecessary to perform a validity check, because the signature cannot be spoofed.

The platform of host system 200 may include processor 210, as well as an operating system running on processor 210. The platform may be considered to include one or more circuits/integrated circuits/components that interact with processor 210 to provide an operating environment for host system 200. The platform may also include one or more circuits/components of hardware in network interface 250, I/O interface 230, and/or mass storage 240. In one embodiment state hardware 214 represents one or more registers on processor 210 or another location on the platform accessible by software using software application I/O calls. In one embodiment one or more registers of state hardware 214 may be mapped to adjunct processor 220 or a register of a hardware device associated with a device driver, which may help preserve locality.

The data, instructions, and/or program information may be provided via an article of manufacture by a machine/electronic device/hardware and performed by/on computing device 100. An article of manufacture may include a machine accessible/readable medium having content to provide instructions, data, etc. The content may result in computing device 100 performing various operations, executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above.

Figure 3:
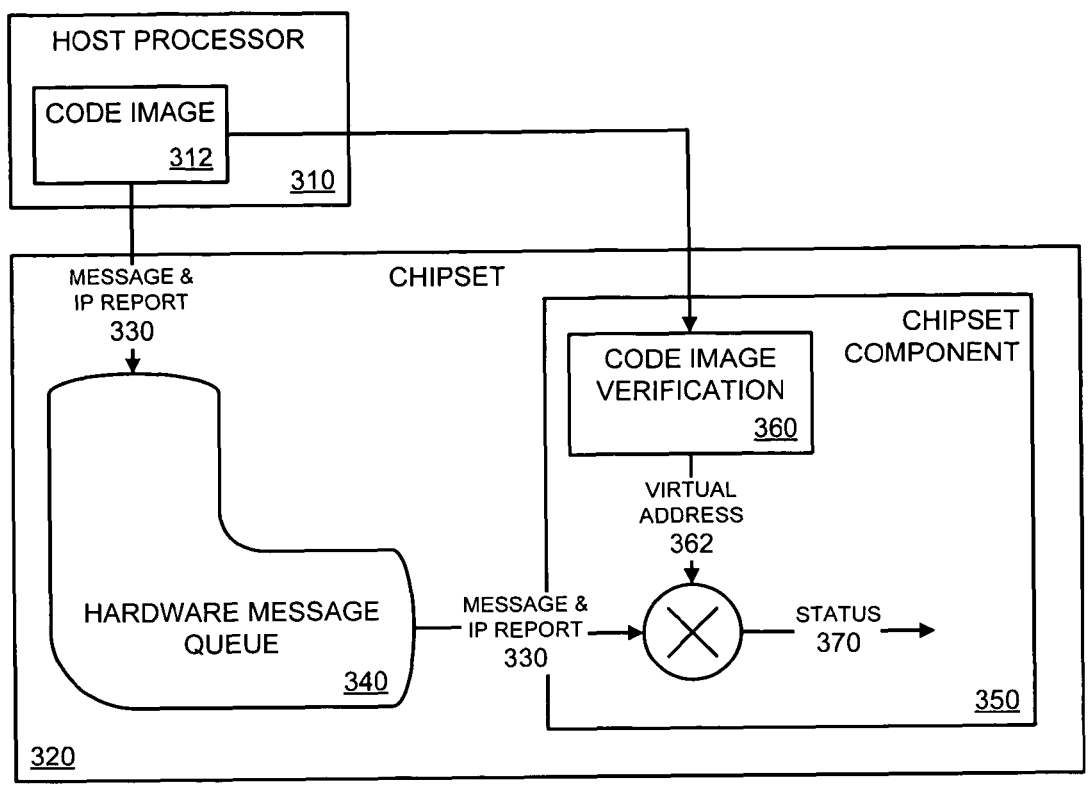
FIG. 3 is a block diagram of an embodiment of chipset hardware proving identity of code executing in a host processor.

FIG. 3 is a block diagram of an embodiment of chipset hardware proving identity of code executing in a host processor. Host processor 310 may include a code image 312, for example, on a memory accessible to host processor 310. Host processor 310 may send a message to an adjunct processor, for example, an embedded processor, a parallel processing core, another chipset component, etc., to allow the adjunct processor to verify the message source. In FIG. 3, the adjunct processor is represented as chipset component 350 on chipset 320.

In one embodiment host processor 310 sends message 330 with an instruction pointer (IP) report to hardware message queue 340. The mechanisms by which host processor 310 may be caused to send message 330 and/or mechanisms by which host processor 310 sends message 330 will be explained in more detail below. Hardware message queue 340 may represent that more than a single message may be serviced at a time. If a message requested authentication of a software program is sent to chipset component 350 and a previously sent authentication request is still being, or still to be processed by chipset component 350, the message may be queued until chipset component 350 is able to process the request. Message 330 may represent a request for a particular program defined in message 330, as well as including an IP report to indicate a hardware state of host processor 310 at the instruction cycle when message 330 is generated. In one embodiment the operation of the adjunct processor generates the IP report.

In addition to the request and hardware state, host processor 310 indicates code image 312 to chipset component 350 for code image verification 360. Code image 312 is verified to be integral, or to fail an integrity check due to one or more discrepancies detected in code image verification 360. Code image verification 360 may in one embodiment generate one or more virtual addresses 362 if the code image verifies correctly. If code image 312 fails the integrity check, an error may be generated rather than virtual address 362. Virtual address 362 may indicate one or more addresses associated with the program to which code image 312 corresponds. For example, one or more valid memory ranges may be generated to indicate a valid location in virtual memory from which machine instructions of the program may be retrieved. Virtual address 362 may indicate a valid entry point or start point for execution of the program to verify that an instruction was executed in a proper sequence, or called from a proper function.

When message 330 is queued up, the message and IP report may be tested with information reported by virtual address 362 to produce status 370. In one embodiment IP report will include the physical address of an instruction. Thus, testing message 330 may include tracing virtual address 362 back to the physical address in the host system. Alternatively, a mechanism may be put in place to generate a corresponding virtual address to report in the IP report. Status 370 may indicate that the program is authenticated, and so execution may proceed in sequence. Status 370 may indicate that the program fails authentication, and produce an exception or an error.

Figure 4:
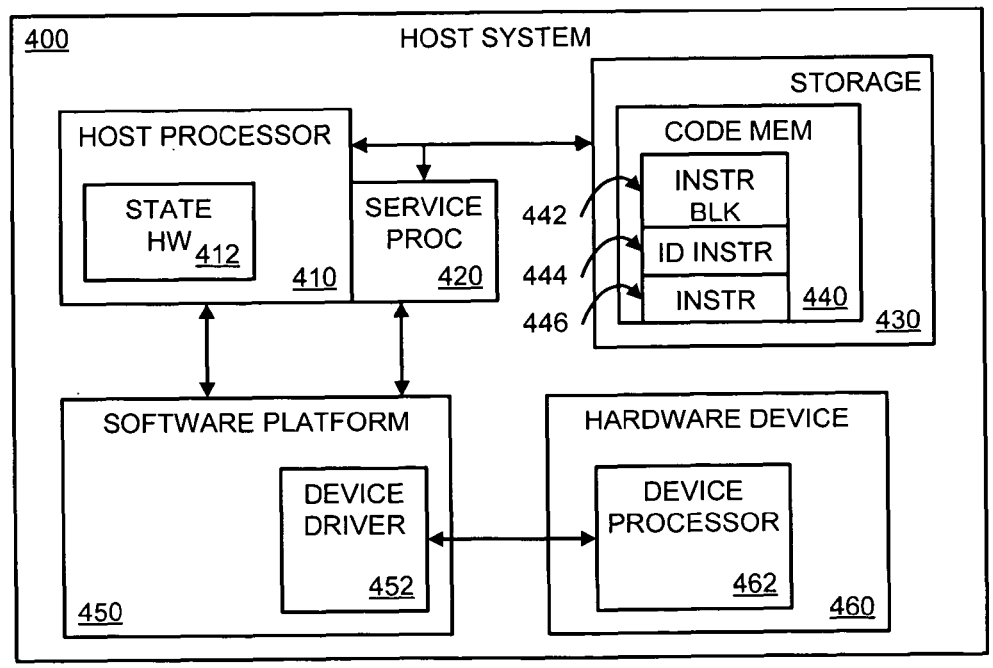
FIG. 4 is a block diagram of an embodiment of a host system having hardware with which identity of a software program may be verified.

FIG. 4 is a block diagram of an embodiment of a host system having hardware with which identity of a software program may be verified. Host system 400 includes host processor 410, which may have state hardware 412, as described previously. Host processor executes programs on host system 400, and may receive an instruction from a program to perform an operation that generally requires an indication of a program's identity prior to execution. Some examples of operations that may require a program's identity include changing rules and/or configurations of a firewall, disabling or altering a configuration of an antivirus program or antivirus agent, altering the configuration of a security agent, sending traffic in the clear when a virtual private network (VPN) should be used, sending a data packet that should be audited prior to transmission, changing disk controller access settings, etc. Other examples include operating system functions, for example, altering settings on an operating system loader or an operating system symbol table. Other circumstances that might benefit from verifying a program identity may include sending packets on a network device, saving a setting to an I/O device or a video/graphics component. The use of authentication for an I/O device and/or network device may include an implementation where a secure network location has been accessed, and sensitive information may be requested (for example, bank account numbers, social security numbers, etc.). The input device (e.g., keyboard) can be authenticated to make sure that information typed into the keyboard is being sent to the correct account, and not some other account, for example.

In one embodiment service processor 420 represents an adjunct processor of host system 400, and may reside as a partition of host processor 410, an embedded device or chipset component, etc. Service processor 420 may also be implemented by the host processor when it executes a code on a secured/trusted partition. Service processor 420 is able to access state hardware 412 of host processor 410, either directly, or through being sent the information from a program (e.g., device driver), or from host processor 410 itself. Storage 430 represents locations to store information, data, machine instructions, program instructions, etc. Storage 430 may include temporary (e.g., RAM) and/or persistent (e.g., hard drive) memory.

In one embodiment storage 430 includes code memory 440, which represents a sequence of instructions to be executed on host processor 410. One mechanism with which service processor 420 may obtain state information and/or access to state hardware 412 to access state information, includes an instruction of an instruction set of host processor 410. Such an instruction may not exist in all processors, and could be added to an instruction set for incorporation of the features of program authentication. Code memory 440 is shown with various sections of code or machine instructions. Instruction block 442 represents one or more instructions that may provide some portion of program code. Instruction 446 likewise represents one or more instructions that may provide some portion of program code. ID instruction 444 may represent an instruction as mentioned above, to indicate to host processor 410 to save state information, for example, at a specified secure location in storage 430. The secure location may then be accessed by a proper entity to determine the secure information. In one embodiment only processor microcode is allowed to write to the secure location, to prevent compromise of the information.

In one embodiment the secure location is monitored, and if an additional access to the secure information occurs, the information obtained from the secure location is invalidated, and either the process may be aborted due to an error condition, or a certain number of retries may be attempted prior to aborting. In operation, host processor 410 may execute instructions from instruction block 442, and then come upon ID instruction 444, at which point it may dump the contents of one or more registers to a secure location for retrieval. The processor may be halted, either stopping the processor from receiving the instruction cycle (i.e., stopping or disabling the clock), or putting the processor into an empty loop (e.g., testing to see if authentication is complete, and if not, looping back to test again) until the authentication procedure is completed. In one embodiment processing continues with instruction 446 upon restarting processor 410.

Another mechanism may be described with reference to the use of a processor interface port, for example, a debug port or a JTAG or TAP interface. In one embodiment host processor 410 includes a JTAG interface that may be accessed with an I/O call to a register on host processor 410. In conjunction with the I/O call, or in response to a secondary request through the interface, state information may be retrieved from the state hardware. As before, the information could be stored to a secure memory location, and unauthorized access and/or multiple accesses may trigger an error. In one embodiment an entity on software platform 450 may make the I/O call to trigger the JTAG interface. For example, device driver 452 may trigger the interface. Device driver 452 may represent software that is associated with, or corresponds to, a hardware component/device/circuit. Device driver 452 may be the software provided through which to interface with hardware device 460. In response to an instruction from hardware device 460, or as part of execution of code of device driver 452, the I/O call could be made to trigger the JTAG interface access. For example, a device driver for a network interface card/circuit (NIC) may provide that the source software be authenticated for each new connection made and/or each packet sent.

Another mechanism may be described with reference to interrupt handlers of host processor 410. For example, device processor of hardware device 460 and/or device driver 452 may trigger an interrupt in host processor 410. Upon interruption, an interrupt service routine (ISR) may be executed and the state of the processor may be saved. In some operating systems state of the processor is saved upon entrance into the ISR, so this approach may be natural for some architectures. The ISR may save state to a secure memory location as described above, or may send the information directly to service processor 420, or the adjunct processor that will be performing the authentication. In one embodiment service processor 420 may be device processor 462.

Figure 5:
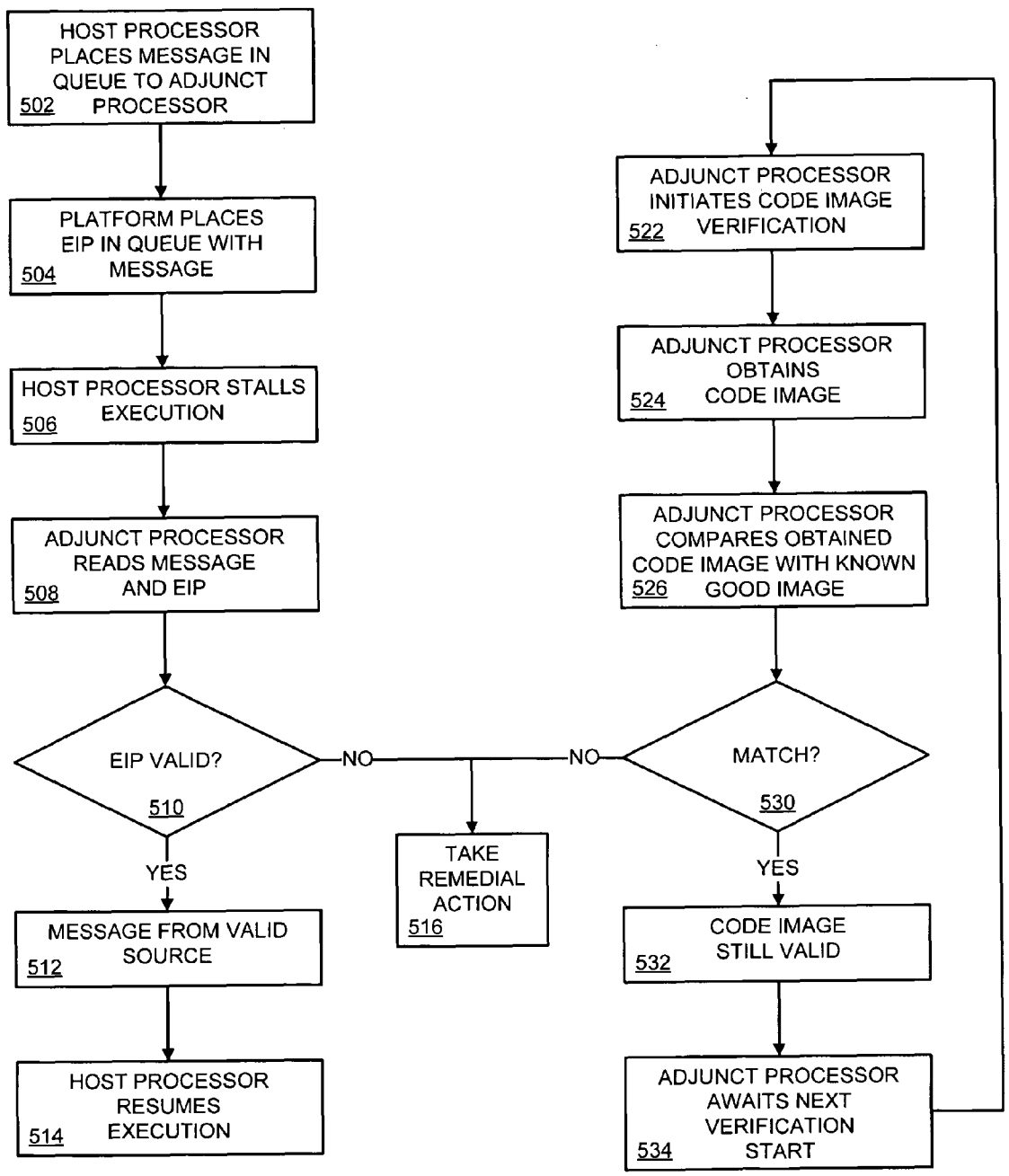
FIG. 5 is a flow diagram of an embodiment of proving identity of a software program.

FIG. 5 is a flow diagram of an embodiment of proving identity of a software program. In one embodiment two processes occur as two branches of a single authentication process. There may be sequential ordering to the two branches, or they may occur substantially in parallel, or substantially simultaneously on separate devices. Together the two branches may determine the identity of a program by verifying two fundamental aspects of the program, for example, what the program is (whether its machine code exists as expected, without alteration) and where the program is (whether it is executing from the proper place in memory).

A host processor may place a message in a queue for an adjunct processor, 502. The host processor and adjunct processor may be as described herein. Placing the message in the queue may indicate the host processor sending the message to the adjunct processor, or saving the information in a location of memory accessible only to entities with permissions. In one embodiment the message includes information that may be mapped directly to registers in the adjunct processor. The platform may place an EIP (enhanced instruction pointer) value in the queue with the message, 504. The platform may place the EIP in the queue in conjunction with the host processor sending the message. The EIP may represent a state of the host processor, indicating an address of an instruction.

In one embodiment the host processor stalls execution, 506. Stalling the host processor may include placing the host processor in a loop that awaits a condition to restart execution. For example, I/O access may be suspended in response to the message being sent. The condition may include restoration of I/O access. In another example, an ISR may be entered in response to the message being sent, or an ISR may send the message. The condition may thus include exiting the ISR.

The adjunct processor accesses the message and reads the message and EIP, 508. In one embodiment the adjunct processor functionality is implemented by the target I/O device. In such a case, the I/O device could refuse and/or alert a code with an invalid EIP. If the EIP is valid, 510, the message is determined to be from a valid source, 512. The adjunct processor may retrieve information directly from the registers, as described, or through retrieval from a memory location, as described. The EIP may be determined to be valid if the EIP indicates an address that is within a valid address range. The address range may be in virtual or physical memory, depending on the implementation of a particular system. In addition, or alternatively, the message can be tested to determine that the instruction came from a code sequence entered from a proper entry point. If the message is valid and the message source determined to be valid, the host processor may resume execution, 514. If the EIP is invalid, 510, the adjunct processor may take remedial action, 516. Remedial action may include signaling an error condition, generating a message to indicate the condition, etc.

The adjunct processor initiates code image verification, 522. The code image verification may be initiated as a schedule-driven (planned) event or as a condition-driven (spontaneous) event. A planned event may occur as part of a regular routine. For example, after a certain number of events, or after a certain number of clock cycles the adjunct processor may initiate code image verification. A spontaneous event may occur in response to events that may not occur with precise regularity. For example, every new connection requested on a network interface may cause the network interface to initiate code image verification.

The adjunct processor obtains a code image, 524. The code image may be obtained, for example, through a DMA connection, or through another hardware-based mechanism that generally could not be circumvented by software. The code image can be a full image, or a result of a procedure performed on the code (for example, a hash function). The adjunct processor compares the obtained code image with a known good image, 526.

If the known good image and the obtained image do not match, 520, remedial action may be initiated, 516. If the images match, 530, the code image is still valid, 532, and the adjunct processor may await the next verification start, 534. The code image may be valid until the code source is modified by an unauthorized entity, such as an attacker.

In one embodiment the start of the code image verification causes the adjunct processor to send a message to cause the host processor to place the message in the queue. Thus, the adjunct processor may verify not only the validity of the code of a program to be executed, but the source location of the program.

Figure 6:
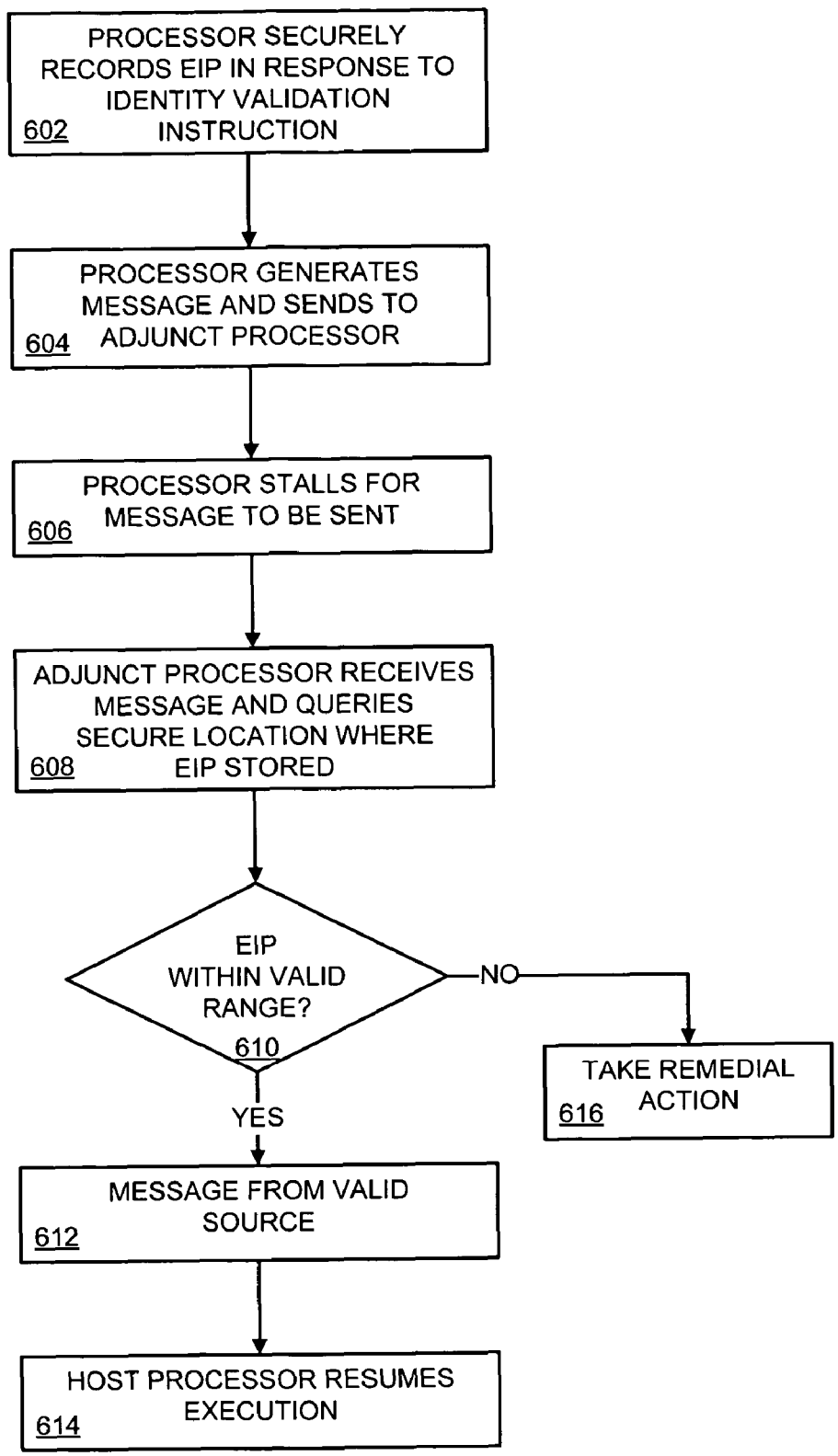
FIG. 6 is a flow diagram of an embodiment of proving identity of a software program with a processor instruction.

FIG. 6 is a flow diagram of an embodiment of proving identity of a software program with a processor instruction. In one embodiment a processor instruction set includes an instruction to test the validity and identity of a program to be executed on the processor. The processor may securely record an enhanced instruction pointer (EIP) in response to receiving the identity validation instruction, 602. The processor generates a message and sends it to an adjunct processor, 604. The message may indicate a secure location where the EIP is stored. The processor may stall for the message to be sent and processed, 606. This may prevent the processor from executing an operation for which the instructing program should first be authenticated, such as changing security settings/configurations, etc.

The adjunct processor may receive the message and query the secure location where the EIP is stored, as indicated in the message, 608. If the EIP is within a valid, or expected, range, 610, the message is deemed to be from a valid source. The host processor may then resume execution, 614, when the source is deemed to be valid. If the EIP is outside the valid range, remedial action may be take, 616, which may include aborting execution of the operation.

Figure 7:
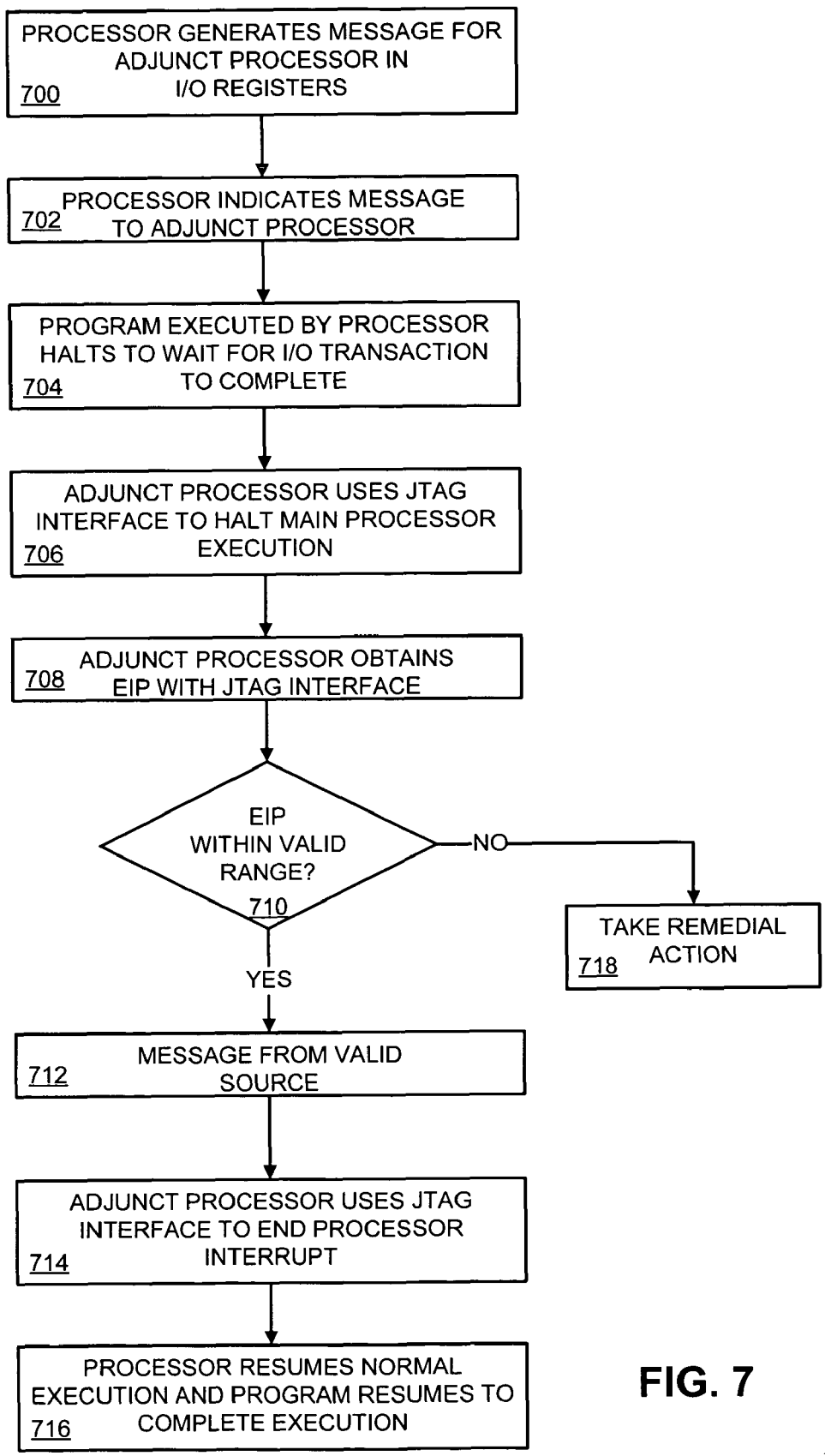
FIG. 7 is a flow diagram of an embodiment of proving identity of a software program with a processor physical state interface.

FIG. 7 is a flow diagram of an embodiment of proving identity of a software program with a processor physical state interface. In one embodiment a processor is equipped with a JTAG, or equivalent, or other similar interface. The JTAG port allows an external entity to access the processor and obtain state information from hardware in the processor. In one embodiment the processor generates a message for an adjunct processor in I/O registers, 700. This may be in response to an I/O access request made by the adjunct processor. The message may include information relating to a hardware state, for example, an address of the instruction pointer at the particular instruction cycle in which the message is generated. The processor may indicate the message to the adjunct processor, 702. This may be with a signal line or communication interface line, bus, etc., coupling the processor to the adjunct processor.

The processor may halt the program being executed by the processor to wait for the I/O transaction to complete, 704. The processor may have a hardware mechanism in place that halts processor execution until the I/O transaction is complete. The processor may wait the end of the transaction prior to proceeding with execution of the next program instruction. The adjunct processor may use a JTAG interface to halt the main processor execution, 706. The processor halts execution of the program, for example, by entering a loop to wait for the completion of the I/O transaction. The JTAG interface, in contrast, may halt the processor from even performing the loop. In this case state in the processor may be preserved by virtue of the fact that the processor is frozen, and so does not change the values in its registers.

The adjunct processor may then use the JTAG interface to obtain the value of one or more registers in the processor, including the EIP, 708. The EIP may be the message the processor generated above and placed in the I/O register(s). The adjunct processor determines if the EIP is within a valid range, 710. The valid range may be an expected address or within an expected area of memory locations. If the EIP is outside the range, remedial action may be taken, 718.

If the EIP is within the valid range, the message is considered to be from a valid source, 712, and the adjunct processor may use the JTAG interface to end the processor interrupt, 714. The main processor execution may be reengaged and the processor allowed to continue with normal operation. The processor resumes normal execution and the program resumes to complete execution, 716. The processor may exit the wait for the I/O transaction and resume execution of the program, which may be executed to completion or abortion, or continue execution until another interrupt, after which execution may proceed.

Figure 8:
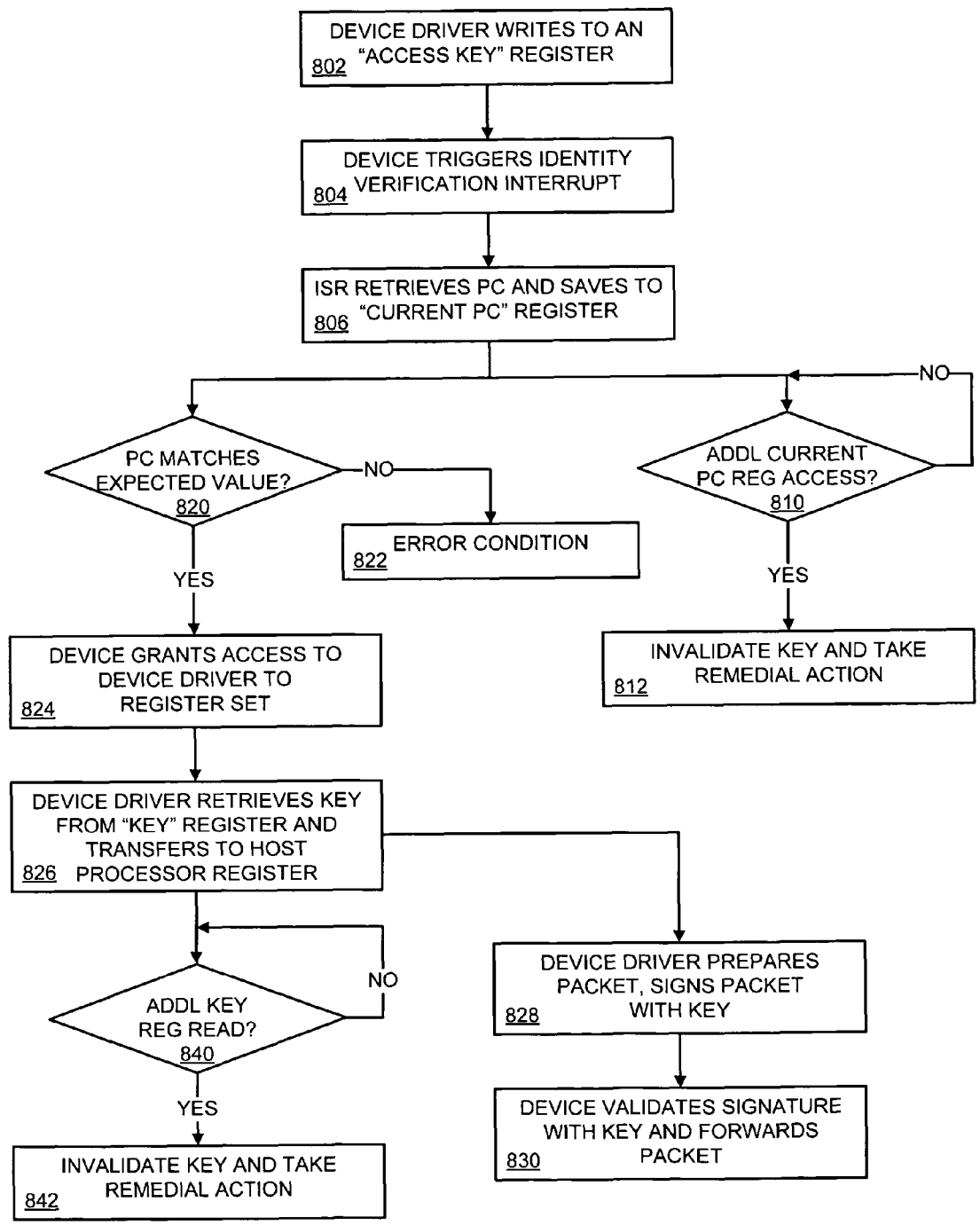
FIG. 8 is a flow diagram of an embodiment of proving identity of a software program with a processor interrupt.

FIG. 8 is a flow diagram of an embodiment of proving identity of a software program with a processor interrupt. In one embodiment a system is provided with one or more registers and an interrupt service routine associated with the registers. The registers may provide a mechanism with which an entity external to a host processor may trigger an interrupt for the host processor. The registers may be located on an operating platform of a system. The mention of "registers" may be understood as referring to multiple, separate physical registers or memory locations, and/or it may refer to separate bits or bit-fields in a register. Thus, a single physical entity could be used as multiple different "registers" as described herein. Additionally, the registers may be one or more locations on the host platform that are mapped as registers to a hardware device that will be accessed using the registers.

In one embodiment a device driver or other software associated with a hardware device/component, or software/program to interface with the hardware device may write to an "access key" register, 802. The access key register may provide a location for software to request or signify desire to access the hardware device. The device, in response to receiving the request in the register or detecting the register, the device may trigger an identity verification interrupt, 804. This may be standard for the device to request identity verification of the requesting software for each request made. The interrupt may halt the processor execution on the host platform and pause execution of the program that generated the access key register write, for example, the device driver. An interrupt service routine (ISR) may be entered to handle the interrupt generated by the device, and the ISR may retrieve the program counter (PC) and save the value to a "current PC" register, 806. The current PC register may be located on the device itself. The PC may indicate an address of the instruction being executed that caused the device resource access request.

In one embodiment once the ISR stores the PC value in the current PC register and accesses the value to compare the value against an expected value, the register is constantly monitored until completion of the process. Thus, hardware on the device determines if an additional access to the current PC register is made, 810. If no access is made, the condition to continue is satisfied, and the monitoring of the register continues. If an access is made, a key associated with accessing the device is invalidated, and remedial action is taken, 812. Remedial action may include indicating to the device driver to retry the access. If some threshold number of retries fail, an error condition may occur. This may also trigger other remedial action (quarantining the program, notifying a security entity, etc.).

The device may access the PC value stored in the current PC register to determine if the value matches an expected value, 820, which may be a certain range or value of address, as explained previously. If the PC value does not match, an error condition may be generated, 822, which may include denying access to the hardware resource for the device driver. If the PC value is deemed valid, the device grants access to the device driver to one or more registers and/or register locations (bits/bytes), 824. Although not discussed with regard to this figure, which details only the proving of instruction/operation memory location to the device or other adjunct processor, the device may also perform a code image verification of the device driver that must similarly verify to fully authenticate the device driver.

One value in a register may be a "key" register, which may contain a security key that the device driver may retrieve from the key register to transfer to the host processor, 826. Transferring to the host processor may include storing the key in a register of the host processor. The storing of the key in the register of the host processor may indicate to the host processor, for example, to microcode on the processor, the identity of the software program. Note that this presenting of the key to the processor may be similar to a traditional key exchange procedure; however, the key is only obtained in this procedure when a memory location associated with the key request is proven to be valid. As explained above, in conjunction with proving the valid source location of the operation of the device driver, validation of another fundamental aspect of the software's identity (e.g., a valid code image) may also be required for the device driver to have permission to access the key.

After the read of the key by the device driver, the key register may be monitored, as described above with respect to the current PC register, to determine if another read of the key is made, 840. If the key has been used, the system may prevent stealing of the key by making it a "single-use" key and disabling the key after access of the key by the authenticated entity. Thus, if the key has not been read, the procedure is allowed to continue as the register is monitored. If, however, an additional read of the key is made, the key may be invalidated and remedial action taken, 842.

In the absence of exception conditions as described with respect to additional register access, the device driver that has been authenticated with the hardware resource with its fundamental software properties, and authenticated to the host processor with the use of a security key, may prepare a packet and sign the packet with the key, 828. The device may then validate the signature with the key and forward the packet to its destination, 830, which may be inside or outside the system.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   validating, with an adjunct processor separate from a host processor, an integrity of a runtime code sequence loaded in memory from which the host processor executes software programs,
      the code sequence associated with an operation to be executed on the host processor, the operation part of a runtime software program loaded in memory under an operating system that executes on the host processor,
      the validating including comparing a code image of the code sequence as loaded for runtime in memory to a stored code image of the code sequence,
   wherein the code image is a full image or a result of a procedure performed on the code sequence; and
   determining, with the adjunct processor, that a source memory location of the operation of the software program loaded in memory lies within a memory location associated with the code sequence.

2. A method according to claim 1, wherein validating the integrity of the code sequence loaded in memory comprises:
   accessing the code sequence in memory; and
   performing a byte-by-byte comparison of the code sequence against a known valid copy of the code sequence.

3. A method according to claim 1, wherein validating the integrity of the code sequence loaded in memory comprises:
   accessing the code sequence in memory;
   performing a cryptographic hash on the code sequence; and
   comparing a result of the cryptographic hash against an expected value.

4. A method according to claim 1, wherein determining the source memory location of the operation further comprises obtaining a hardware state of the host processor.

5. A method according to claim 4, wherein obtaining the hardware state further comprises halting the processor to prevent the processor from executing other operations until the integrity of the image is validated and the source location of the operation is determined.

6. A method according to claim 5, wherein halting the processor comprises disabling the instruction cycle counter in the processor.

7. A method according to claim 5, wherein halting the processor comprises placing execution of the processor in a wait loop until the integrity of the image is validated and the source location of the operation is determined.

8. A method according to claim 4, wherein obtaining a hardware state of the processor comprises obtaining a value of an instruction pointer of the processor.

9. A method according to claim 8, wherein obtaining the hardware state further comprises providing an instruction of an instruction set of the processor to cause the processor to record a hardware state value to a secure memory location.

10. A method according to claim 8, wherein obtaining the hardware state further comprises providing an interrupt and an interrupt service routine, the interrupt service routine to execute instructions to obtain the hardware state.

11. A method according to claim 10, further comprising the interrupt service routine to send the obtained hardware state to an adjunct processor to validate the integrity of the image and verify the source location of the operation.

12. A method according to claim 8, wherein obtaining the hardware state further comprises accessing hardware state information from the registers of the processor through a Joint Test Action Group (JTAG) processor interface.

13. An article of manufacture comprising a computer readable storage medium having content stored thereon, which when accessed provide instructions to cause a processor to perform operations including:
    receiving an instruction from a runtime software program loaded in memory to request execution on a host processor of an operation for which the software program is requested to present its identity;
    determining an integrity of the software program with an adjunct processor separate from the host processor, including comparing a code image of the software program as loaded in memory to a stored code image of the software program in nonvolatile storage, wherein the code image is a full image or a result of a procedure performed on the code sequence;
    obtaining state information of the host processor with the adjunct processor; and
    determining, with the adjunct processor, based at least in part on the obtained state information, whether the request originated from an instruction located within an expected memory location.

14. An article of manufacture according to claim 13, wherein the content to provide instructions to result in determining the integrity of the software program comprises the content to provide instructions to result in verifying an executable file is unmodified from a known good state.

15. An article of manufacture according to claim 13, wherein the content to provide instructions to result in determining the integrity of the software program comprises the content to provide instructions to result in verifying a linked code file is unmodified from a known good state.

16. An article of manufacture according to claim 13, wherein the content to provide instructions to result in obtaining state information comprises the content to provide instructions to result in obtaining a virtual memory address, and further comprises the content to provide instructions to result in tracing the virtual memory address to a corresponding physical memory address.

17. An apparatus comprising:
    a host processor coupled to a memory to execute instructions from the memory, including executing an instruction from code of a program loaded in memory directing the host processor to configure a setting associated with a software routine to interface with a hardware component; and
    an additional processor coupled to the host processor to obtain state information of the host processor at a particular instruction cycle, the state information to include a physical memory location of the instruction, and an image of the program code, the additional processor further to validate the image of the program code as loaded in memory with a known valid code image stored in nonvolatile storage, wherein the code image is a full image or a result of a procedure performed on the code sequence, and
    verify based, at least in part, on the obtained state information, that the physical memory location of the instruction lies within an expected sector of the memory.

18. An apparatus according to claim 17, wherein the additional processor comprises a parallel processing core on the host processor.

19. An apparatus according to claim 17, wherein the additional processor comprises a separate physical processor from the host processor, coupled to the host processor over a communication interface.

20. An apparatus according to claim 19, wherein the separate physical processor comprises a processor on a hardware component, the hardware component being one of a network interface circuit, a graphics interface circuit, an audio interface circuit, or a user input interface circuit.

21. An apparatus according to claim 17, further comprising the additional processor to interrupt execution of the host processor and obtain the state information with one or more of a Joint Test Action Group (JTAG) interface, an interrupt service routine, or access of a secure memory location wherein the state information was stored.

22. A method comprising:
    receiving an instruction from an executing code routine to modify a runtime configuration of an image of a software program loaded in memory, the software program for interacting with a hardware component;
    validating an integrity of the code routine as loaded in memory and a source location in memory of the instruction to modify the runtime configuration of the software program,
        where the validation is performed with a processing component external to a main processor, the main processor to execute code from the memory including the code routine and the software program,
        where validation includes comparing an image of the code routine as loaded in memory to a stored image of the code routine in nonvolatile storage; and
    modifying the configuration of the software program if the integrity and the instruction location are validated, otherwise triggering an exception condition.

23. A method according to claim 22, wherein validating the integrity of the code routine comprises validating an integrity of a data file having a configuration setting associated with the code routine.

24. A method according to claim 22, wherein to modify the configuration of the software comprises altering a security setting associated with the hardware component.

25. A method according to claim 22, wherein to modify the configuration of the software program comprises one or more of changing software firewall rules, disabling an antivirus program, changing a rule applicable to an antivirus agent, changing a rule applicable to a security agent, sending a traffic packet associated with a virtual private network (VPN) outside the VPN, an operating system loader, and operating system symbol table, or changing a disk controller access setting.

26. A method according to claim 22, wherein validating the integrity of the code routine comprises providing a security key in a hardware register on the hardware component.

27. A method according to claim 26, further comprising:
    allowing the code routine to access the security key from the hardware register; and invalidating the security key if an additional access of the security key is made.

28. A system comprising:
a synchronous dynamic random access memory (SDRAM) having a program stored thereon to provide an instruction to direct hardware executing the instruction to configure a setting associated with a hardware interface software routine;
a host processor coupled to the SDRAM to execute the instruction from the SDRAM; and
an adjunct processor coupled to the SDRAM and the host processor to
  obtain state information of the host processor at a particular instruction cycle, the state information to include a physical memory location in the SDRAM of the instruction, and a code image of the program stored on the memory,
  validate the code image of the program as loaded in the SDRAM with a known good code image by comparing the code image of the program as loaded in the SDRAM to a stored known good code image of the program,
    wherein the code image is a full image or a result of a procedure performed on the code sequence, and
  verify based, at least in part, on the obtained state information, that the physical memory location of the instruction lies within an expected sector of the SDRAM.

29. A system according to claim 28, the adjunct processor to obtain the state information of the host processor at the particular instruction cycle comprising the adjunct processor to access the state information by performing one or more of interacting with the host processor through a Joint Test Action Group (JTAG) interface on the host processor, receiving a message from an interrupt service routine, accessing a secure memory location having the state information.

30. A system according to claim 28, wherein the adjunct processor to validate the image of the program with the known good image comprises the adjunct processor to:
  obtain the known good image from a non-volatile storage;
  perform a cryptographic hash on the known good image and the image of the program; and
  determine if the result of the cryptographic hash of the image of the program matches the result of the cryptographic hash of the known good image.

* * * * *